United States Patent
Day et al.

(10) Patent No.: US 6,248,858 B1
(45) Date of Patent: Jun. 19, 2001

(54) METHOD FOR CONDUCTING SOLID STATE POLYMERIZATION OF POLYCARBONATES

(75) Inventors: James Day, Scotia, NY (US); Godavarthi Satyana Varadarajan, Dallas, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/192,350

(22) Filed: Nov. 16, 1998

(51) Int. Cl.$^7$ .................................................. C08G 64/00
(52) U.S. Cl. ............................................. 528/196; 528/198
(58) Field of Search ...................................... 528/196, 198

(56) References Cited

U.S. PATENT DOCUMENTS

| | | | |
|---|---|---|---|
| 4,948,871 | 8/1990 | Fukuoka et al. | 528/196 |
| 5,214,073 | 5/1993 | Fukawa et al. | 528/196 |
| 5,905,135 | 5/1999 | Idage et al. | 528/196 |

FOREIGN PATENT DOCUMENTS 9845351   10/1998   (WO) .

OTHER PUBLICATIONS

International Search Report Oct. 15, 1999.

*Primary Examiner*—Terressa M. Boykin
(74) *Attorney, Agent, or Firm*—Robert T. Barker; Noreen C. Johnson

(57) ABSTRACT

Polymerization of polycarbonates is performed by first enhancing the crystallinity of a precursor polycarbonate, such as an oligomer, by contact in pellet form with an alkanol in the liquid or vapor state as non-solvent, and then conducting solid state polymerization in a stream of inert gas such as nitrogen. The solid state polymerization operation includes a stage of heating at a constant temperature in the range of about 215–225° C., optionally combined with a first heating stage at a constant temperature in the range of about 180–190° C. The method is adaptable to continuous operation and produces a polycarbonate having a number average molecular weight, as determined by gel permeation chromatography relative to polystyrene, of at least 15,000.

20 Claims, No Drawings

METHOD FOR CONDUCTING SOLID STATE POLYMERIZATION OF POLYCARBONATES

BACKGROUND OF THE INVENTION

This invention relates to polycarbonate preparation, and more particularly to the preparation of aromatic polycarbonates by solid state polymerization.

The methods widely known for preparation of polycarbonates are the interfacial method and the melt method. In interfacial polymerization; a dihydroxyaromatic compound is contacted with phosgene in a mixed aqueous-organic solution, in the presence of an acid acceptor and an amine as catalyst. This method is falling out of favor because of the toxicity of phosgene and the environmental hazards of methylene chloride, the most commonly employed organic solvent. A similar method, in which oligomeric chloroformates are prepared interfacially and are then converted to high molecular weight polycarbonate, has similar disadvantages.

In the melt preparation method, a bisphenol is contacted with a diaryl carbonate in the melt in the presence of a suitable catalyst. An oligomeric polycarbonate is first produced and it is converted to a high molecular weight polycarbonate by increasing the polymerization temperature. There are also disadvantages in this process, one of them being the high viscosity of the melt polymerization mixture, especially during the molecular weight building step, which causes difficulty of handling.

A third option for polycarbonate formation, solid state polymerization (hereinafter sometimes "SSP"), has become known in recent years. The first polymerization step in the solid state process is oligomer formation by melt polymerization. The oligomer is then subjected to treatment to induce crystallinity therein. The crystallinity-enhanced oligomer is finally heated to a temperature between its glass transition temperature (Tg) and its melting temperature (Tm) in the presence of a catalyst, whereupon polymerization occurs to produce a high molecular weight polycarbonate.

U.S. Pat. No. 4,948,871 and 5,214,073, the disclosures of which are incorporated by reference herein, disclose a method for solid state polymerization in which crystallinity is enhanced by solvent (typically acetone or some other ketone) treatment or heat treatment. The polymerization step is then conducted in one or more stages at temperatures of 180° C. and higher, often with ramping of the temperature during a stage.

One disadvantage of such a process is the fact that it cannot be conveniently conducted continuously. To do so would require multiple reaction vessels, one at each temperature level attained. Thus, ramping of the temperature would be impracticable and the number of necessary vessels would be prohibitively expensive. Further, polymerization rates at temperatures on the order of 180° C., the onset temperature for many SSP processes known in the art, are very slow. Still further, the process is, for the most part, incapable of yielding a polycarbonate having a number average molecular weight (Mn) higher than about 15,000. The only specifically disclosed products with higher Mn values are the product of Example 12 of 4,948,871, having a Mn value of about 25,000 (as calculated from the disclosed values of Mw and Mw/Mn) but requiring ramping of the temperature from 190° to 220° C., and that of Example 9 of 5,214,073, having progressively attained Mn values of 26,000 and 40,000 which require uneconomical polymerization temperatures as high as 230° or 240° C.

It remains of interest, therefore, to develop SSP processes which require a minimum of heating stages, all capable of being performed at a set temperature without ramping, and thus adaptable to continuous polycarbonate production. It is also of interest to develop processes of this type which permit rapid polymerization and which are adapted to produce a polymer having a Mn of 15,000 or greater.

SUMMARY OF THE INVENTION

The present invention is a polycarbonate production method adaptable to achieve the above-summarized goals. It is a method for preparing an aromatic polycarbonate which comprises:

(A) contacting precursor polycarbonate pellets having a diameter in the range of about 1–5 mm with at least one non-solvent therefor, said non-solvent comprising a $C_{1-20}$ alkanol in the liquid or vapor state, to produce an enhanced crystallinity precursor polycarbonate; and (B) subjecting said enhanced crystallinity precursor polycarbonate to solid state polymerization conditions in a stream of inert gas, said conditions including a stage of heating at a constant temperature in the range of about 215–225° C., to produce a polycarbonate product having a number average molecular weight, as determined by gel permeation chromatography relative to polystyrene, of at least 15,000.

DETAILED DESCRIPTION; PREFERRED EMBODIMENTS

Polycarbonates which may be prepared by the method of this invention typically comprise structural units of the formula

(I)

wherein at least about 60% of the total number of R groups are aromatic organic radicals and the balance thereof are aliphatic, alicyclic, or aromatic radicals. Preferably, each R is an aromatic organic radical and more preferably a radical of the formula

—A¹—Y—A²— (II)

wherein each $A^1$ and $A^2$ is a monocyclic divalent aryl radical and Y is a bridging radical in which one or two carbonate atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof.

The bridging radical Y is most often a hydrocarbon group, preferably an aliphatic or alicyclic hydrocarbon group and more preferably a saturated group such as methylene, cyclohexylidene, or isopropylidene which is preferred. Thus, the preferred polycarbonates are those consisting of structural units of formula I (which may be of only one structure or of several structures), in which R has formula II and Y is an aliphatic or alicyclic hydrocarbon group. Especially preferred are polycarbonates derived entirely or in part from 2,2-bis(4-hydroxyphenyl)propane, also known as "bisphenol A".

The essential starting material in step A of the method of this invention is a precursor polycarbonate. It may be a polycarbonate oligomer of the type produced by the first step of a melt polycarbonate process or by bischloroformate oligomer preparation followed by hydrolysis and/or endcapping and isolation. Such oligomers most often have a weight average molecular weight (Mw) in the range of about 2,000–10,000, all molecular weights herein being determined by gel permeation chromatography relative to polystyrene, and an intrinsic viscosity in the range of about 0.06–0.30 dl/g, all intrinsic viscosity values herein being as determined in chloroform at 25° C.

Both homopolymer and copolymer precursor polycarbonates may be employed. Copolycarbonates include those containing, for example, bisphenol A carbonate structural units in combination with carbonate units derived from other bisphenols or from polyethylene glycols. Also included are copolyestercarbonates, such as those containing bisphenol dodecanedioate units in combination with carbonate units.

It may also be a relatively high molecular weight polycarbonate, generally having an Mw value in the range of about 10,000–35,000, for which it is desired to increase the molecular weight still further; e.g., up to a value in the range of about 50,000–80,000. For example, optical quality polycarbonate which is off-specification may be crystallized by the method of this invention prior to increasing its molecular weight so that it may be used in other applications.

The precursor polycarbonate may be a branched homo- or copolycarbonate, formed by the reaction of a linear polycarbonate or its precursor(s) with a branching agent such as 1,1,1-tris(4-hydroxyphenyl)ethane. Branched copolycarbonates include oligomers and high molecular weight copolycarbonates containing units adapted to maximize solvent resistance. Hydroquinone and methylhydroquinone carbonate units are particularly suitable for this purpose, as disclosed in U.S. Pat. No. 4,920,200. Such units will typically comprise about 25–50% of total carbonate units in the polymer. Conversion to the branched homo- or copolycarbonate may precede or occur simultaneously with the conversion of the precursor polycarbonate to an enhanced crystallinity polymer.

The precursor polycarbonate may also be a recycled polycarbonate. For example, recycled polymer from compact disks may be employed. Its method of original preparation is immaterial; i.e., recycled polycarbonate originally prepared by interfacial polymerization, by melt polymerization or from bischloroformates may be employed.

Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

Prior to performing step A of the method of the invention, it is within the scope of the invention, particularly when the precursor polycarbonate is a recycled material, to dissolve it in a chlorinated hydrocarbon as solvent. Suitable chlorinated hydrocarbons, include but are not limited to, methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Such dissolution generally leaves behind various insoluble materials, as illustrated by metallic coatings when the precursor polycarbonate is from optical disks, for example. The invention further contemplates removal of said insoluble materials from the polycarbonate solution. This may be achieved by such conventional operations as decantation, filtration and centrifugation.

The recycled polycarbonate is frequently associated with colored impurities, which may appear in the polycarbonate itself or in the solution thereof in the chlorinated solvent. Various embodiments of the invention, therefore, include a step of removing color from the amorphous polycarbonate solution following other removal steps. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another is washing with a solution of sodium gluconate. Still another is washing of the resin, after precipitation as described hereinafter, with non-solvent in an amount sufficient to dissolve color bodies.

The solution of precursor polycarbonate is, for the most part, freed of any solvent prior to crystallization enhancement. It is usually advantageous to precipitate the precursor polycarbonate therefrom by such art-recognized methods as anti-solvent precipitation or steam precipitation.

In step A of the method of the invention, pellets of the precursor polycarbonate are treated to enhance their crystallinity. Said pellets have diameters in the range of about 1–5 mm, preferably about 2–3 mm. They may be produced by such art-recognized operations as extrusion and pelletization.

The crystallinity of the precursor polycarbonate is enhanced according to the invention by contact with at least one non-solvent therefor, selected from the group consisting of $C_{1-20}$ alkanols. The preferred alkanols are $C_1$–$C_5$ primary alkanols, including, but not limited to, methanol, ethanol and 1-butanol. Certain secondary alkanols, such as 2-butanol and 3-pentanol, are also excellent choices. Mixtures of non-solvents may also be employed. The most preferred non-solvent, by reason of its availability and low cost, is methanol.

For the purposes of the present invention, it is generally neither necessary nor contemplated to employ a dialkyl carbonate as required in copending, commonly owned application Ser. No. 08/986,448. One of the features of the method of this invention is that it is not necessary for such relatively expensive compounds to form part of the non-solvent. The use of alkanols is sufficient.

Contact of the precursor polycarbonate with the non-solvent is most often at a contact temperature which is at least 75° C. and which is further defined by the relationship $$T_c \geq T_b - z,$$

wherein $T_c$ is the contact temperature, $T_b$ is the boiling point of the non-solvent at the contact pressure employed (both in degrees C) and z is a constant. The maximum value of z is 60. Preferably, z is 20.

The non-solvent may, at the point of contact with the precursor polycarbonate, be in the liquid or vapor state; contact in the vapor state is usually preferred. Liquid contact is most often effected by submerging the precursor polycarbonate in a bath of the non-solvent, and vapor contact by passing the vapors of the non-solvent upward through a bed of the precursor polycarbonate. It is within the scope of the invention for the contact temperature to be greater than $T_b$, especially when vapor contact is employed, whereupon the pressure of the contact vessel must be maintained above atmospheric pressure. Elevated pressures up to about 10 atm are typical, with pressures up to about 5 atm being preferred. The contact temperature may also be above the glass transition temperature of the precursor polycarbonate.

The time required for contact with the non-solvent will depend on the rate of crystallinity enhancement and will vary according to the non-solvent employed and the conditions of contact. Optimum times can be determined by simple experimentation. For the most part, times in the range of about 15–60 minutes are sufficient.

A principal advantage of the use of alkanols as crystallinity enhancers according to the present invention is that they produce polycarbonate in a crystal habit particularly adapted to SSP at high onset temperature. As previously noted, SSP processes known in the art typically require an onset temperature on the order of 180° C. By the present method, on the other hand, it is possible to begin SSP at a temperature as high as 225° C., facilitating rapid polymerization.

Crystallinity enhancement according to this invention is substantially as described in the aforementioned copending application Ser. No. 08/986,448, in that only surface enhancement of the pellets is necessary. It is often found, however, that the non-solvent swells said pellets and permeates beyond the surface. Crystallinity levels of 5% by weight or greater are typically achieved, with levels in the range of about 15–35% being preferred.

It is often found that polycarbonate oligomers are so brittle they cannot be conveniently extruded and pelletized unless extrusion is into a liquid medium such as water. The present invention contemplates extrusion under ambient temperature and pressure conditions into a non-solvent which is capable of enhancing crystallization under such conditions, as exemplified by methanol, so that pelletization and crystallinity enhancement may be achieved simultaneously.

In step B, the enhanced crystallinity precursor polycarbonate is subjected to SSP conditions. An important feature of this step is the employment of constant temperature levels in the one or, sometimes, two heating stages, which makes it practical to conduct the operation continuously since each physical SSP stage can be maintained at constant conditions. In other words, temperature ramping is not employed in any heating stage.

Only a single heating stage is required and only one is normally preferred, in the temperature range of about 215–225° C. It is, however, within the scope of the invention to additionally employ a first heating stage at a temperature in the range of about 180–190° C. All stages employed involve the use of a stream of inert gas, such as nitrogen or argon, to carry away products of the SSP reaction, such as phenol, which are volatile under the conditions of the stage.

Residence times employed in the one or two heating stages are determined by the time required to afford a polycarbonate product having a desired Mn value which is at least 15,000, in combination with a desired crystallinity level when appropriate. For the most part, a total residence time in the range of about 8–12 hours is sufficient, with about 10–30% of total heating time being in the first stage of a two-stage system. If the SSP reaction is conducted continuously, the flow rate of the enhanced crystallinity precursor polycarbonate through any stage will be adjusted to provide the required residence time or times.

The method of the invention is illustrated by the following examples.

EXAMPLE 1

The crystallization apparatus consisted of a pressurizable vessel serving as a liquid reservoir and a sample holding screen of adjustable height, adapted to be submerged in liquid in the reservoir or positioned in the space above the liquid. This vessel was charged with methanol and pellets of an amorphous bisphenol A polycarbonate oligomer having a Mw of about 8,000, prepared by a transesterification reaction of bisphenol A with diphenyl carbonate, were placed on the screen which was positioned in the space above the liquid. The vessel was sealed and heated to 100° C. at an autogenous pressure of 3.7 atm for 60 minutes, producing an oligomeric precursor polycarbonate having a crystallinity of 22.7%.

A 50-g sample of said enhanced crystallinity oligomer was charged to a cylindrical reactor about 7.6 cm in diameter and 10.2 cm in length. The reactor was tumbled at atmospheric pressure and a temperature of 220° C. for 10 hours, with passage over the oligomer sample of a stream of nitrogen at 2.5 l/min. There was obtained a polycarbonate having a Mw of 40,900, a Mn of 19,800, a Tg of 145° C. and a crystallinity of 57%.

EXAMPLE 2

The enhanced crystallinity oligomer of Example 1 was heated in the cylindrical reactor for 2 hours at 180° C. and for 12 hours at 220° C. The product had a Mw of 56,000, a Mn of 27,000, a Tg of 154° C. and a crystallinity of 73%.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed therein. It is intended that the specification and examples be considered as exemplary only, with the true scope and spirit of the invention being indicated by the following claims.

What is claimed is:

1. A method for preparing an aromatic polycarbonate which comprises:
    (A) contacting precursor polycarbonate pellets having a diameter in the range of about 1–5 mm with at least one non-solvent therefor, said non-solvent comprising a $C_{1-20}$ alkanol in the liquid or vapor state, to produce an enhanced crystallinity precursor polycarbonate; and
    (B) solid state polymerizing the enhanced precursor polycarbonate in a stream of inert gas, the solid state polymerizing comprising a stage of heating at a constant temperature in the range of about 215–225° C., thereby producing a polycarbonate product having a number average molecular weight, as determined by gel permeation chromatography relative to polystyrene of at least 15,000.

2. A method according to claim 1 wherein the precursor polycarbonate is a homopolycarbonate.

3. A method according to claim 1 wherein the precursor polycarbonate is a copolycarbonate.

4. A method according to claim 3 wherein the precursor polycarbonate is a copolyestercarbonate.

5. A method according to claim 1 wherein the precursor polycarbonate is a bisphenol A homo- or copolycarbonate.

6. A method according to claim 1 wherein the precursor polycarbonate is an oligomer having a weight average molecular weight in the range of about 2,000–10,000 as determined by gel permeation chromatography.

7. A method according to claim 1 wherein the precursor polycarbonate has a weight average molecular weight in the range of about 10,000–35,000 as determined by gel permeation chromatography.

8. A method according to claim 1 wherein the precursor polycarbonate is a branched polycarbonate.

9. A method according to claim 1 wherein the precursor polycarbonate is a recycled polycarbonate.

10. A method according to claim 1 wherein the non-solvent employed in step A is methanol.

11. A method according to claim 10 wherein contact in step A is in the liquid state.

12. A method according to claim 10 wherein contact in step A is in the vapor state.

13. A method according to claim 1 wherein contact in step A is at a contact temperature which is at least 75° C. and which is further defined by the relationship $$T_c \geq T_b - z,$$

wherein $T_c$ is the contact temperature, $T_b$ is the boiling point of the non-solvent at the contact pressure employed (both in degrees C) and z is a constant whose value is 60.

14. A method according to claim 1 wherein a single heating stage is employed in step B.

15. A method according to claim 14 wherein the temperature of the single heating stage is 220° C.

16. A method according to claim 1 wherein two heating stages are employed in step B, the first being in the temperature range of about 180–190° C. and the second in the range of about 215–225° C.

17. A method according to claim 16 wherein the temperatures of the first and second heating stages are 180° and 220° C., respectively.

18. A method according to claim 1 wherein the inert gas is nitrogen.

19. A method according to claim 1 wherein the total residence time in the heating stage or stages of step B is in the range of about 8–12 hours.

20. An aromatic polycarbonate prepared by the process of claim 1.

* * * * *